(12) United States Patent
Funayama (10) Patent No.: US 8,549,317 B2
(45) Date of Patent: *Oct. 1, 2013

(54) AUTHENTICATION METHOD, AUTHENTICATION APPARATUS AND AUTHENTICATION PROGRAM STORAGE MEDIUM

(75) Inventor: Osamu Funayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1421 days.

This patent is subject to a terminal disclaimer.

(21) Appl. No.: 11/489,462

(22) Filed: Jul. 20, 2006

(65) Prior Publication Data

US 2007/0239980 A1 Oct. 11, 2007

(30) Foreign Application Priority Data

Apr. 10, 2006 (JP) ................................. 2006-107907

(51) Int. Cl.
 G06F 21/00 (2013.01)
 G06F 17/00 (2006.01)
 H04L 29/06 (2006.01)

(52) U.S. Cl.
 USPC ............................................. 713/186; 726/1

(58) Field of Classification Search
 USPC ............. 713/168, 1, 100, 182, 183, 184, 185, 713/186, 155; 726/1, 2, 14
 See application file for complete search history.

(56) References Cited

U.S. PATENT DOCUMENTS

| | | | | |
|---|---|---|---|---|
| 6,651,168 B1 * | 11/2003 | Kao et al. | ....................... | 713/185 |
| 6,854,009 B1 * | 2/2005 | Hughes | .......................... | 709/220 |
| 6,957,229 B1 * | 10/2005 | Dyor | ...................... | 1/1 |
| 7,305,562 B1 * | 12/2007 | Bianco et al. | .................. | 713/186 |
| 7,376,838 B2 * | 5/2008 | Narayanan | ...................... | 713/183 |
| 7,409,705 B2 * | 8/2008 | Ueda et al. | ......................... | 726/5 |
| 7,424,531 B2 * | 9/2008 | Chiodo et al. | ................. | 709/225 |
| 7,647,625 B2 * | 1/2010 | Grinstein | ........................... | 726/4 |
| 2002/0087894 A1 * | 7/2002 | Foley et al. | ..................... | 713/202 |
| 2003/0054800 A1 * | 3/2003 | Miyashita | ..................... | 455/411 |
| 2003/0093697 A1 * | 5/2003 | Lin | ................................ | 713/202 |
| 2004/0123161 A1 * | 6/2004 | Harada et al. | ................. | 713/202 |
| 2004/0164848 A1 * | 8/2004 | Hwang et al. | ................ | 340/5.82 |
| 2005/0010807 A1 | 1/2005 | Kitamura | | |
| 2005/0015628 A1 * | 1/2005 | Narayanan | ..................... | 713/202 |
| 2005/0060365 A1 * | 3/2005 | Robinson et al. | ............. | 709/203 |
| 2006/0020792 A1 * | 1/2006 | Weiss | ............................. | 713/168 |
| 2006/0265596 A1 * | 11/2006 | Nagayama | .................... | 713/182 |

(Continued)

FOREIGN PATENT DOCUMENTS

| | | |
|---|---|---|
| EP | 1 475 686 | 11/2004 |
| GB | 2342744 A | 4/2000 |

(Continued)

OTHER PUBLICATIONS

Japanese Office Action mailed Jun. 21, 2011 for corresponding Japanese Application No. 2006-107907, with English-language translation.

Primary Examiner — Eleni Shiferaw
Assistant Examiner — Abu Sholeman
(74) Attorney, Agent, or Firm — Fujitsu Patent Center (57) ABSTRACT

When only a fingerprint authentication approach is set, it is displayed that only authentication by the fingerprint authentication approach is accepted, and authentication by the fingerprint authentication approach is performed. Meanwhile, at least a system administrator is enabled to perform authentication by a password authentication approach.

24 Claims, 8 Drawing Sheets

(56) References Cited

U.S. PATENT DOCUMENTS

| | | | |
|---|---|---|---|
| 2007/0036400 A1* | 2/2007 | Watanabe et al. | 382/124 |
| 2007/0057763 A1* | 3/2007 | Blattner et al. | 340/5.52 |
| 2007/0079356 A1* | 4/2007 | Grinstein | 726/2 |
| 2007/0079357 A1* | 4/2007 | Grinstein | 726/2 |
| 2007/0143839 A1* | 6/2007 | Chen et al. | 726/17 |
| 2007/0147669 A1* | 6/2007 | Hamid et al. | 382/124 |

FOREIGN PATENT DOCUMENTS

| | | |
|---|---|---|
| JP | 2000-122975 A | 4/2000 |
| JP | 2002-222022 | 8/2002 |
| JP | 2002-288140 A | 10/2002 |
| JP | 2004-334859 | 11/2004 |

* cited by examiner

| ID | DATA |
|----|------|
| 0001 | ******** |
| 0001 | (FINGERPRINT DATA) |
| 1001 | x x x x x x x x |

| | AUTHENTICATION APPROACH |
|---|---|
| PASSWORD | OFF |
| FINGERPRINT | ON |

AUTHENTICATION METHOD, AUTHENTICATION APPARATUS AND AUTHENTICATION PROGRAM STORAGE MEDIUM

BACKGROUND OF THE INVENTION

1. Field of the Invention

The present invention relates to an authentication method and an authentication apparatus for authenticating that a user is a valid user of a computer apparatus and the like, and an authentication program storage medium in which an authentication program for causing an information processing apparatus such as a computer apparatus to operate as the authentication apparatus is stored.

2. Description of the Related Art

There has been devised a mechanism in which it is authenticated that the user is a valid user before a computer apparatus is activated. As an example of such a mechanism, password authentication which uses pre-registered combination of characters and numerals has been widely adopted. However, recently, an authentication approach which uses biological data, such as fingerprint authentication and palm vein authentication, is increasingly spreading. Since the risk of analogy or possibility of spoofing is low in the biological data authentication in comparison with the password authentication, biological data authentication is increasingly used for authentication performed at activation of a computer apparatus as only one authentication approach in companies or organizations where more robust security management is required.

However, once biological data authentication is set as only one authentication approach performed at activation, there may be a case where a system administrator cannot activate the apparatus when it is necessary. For example, if the system administrator has a part of his body used for the biological data authentication, such as a finger and a hand, injured or if biological data authentication equipment connected to the computer apparatus becomes out of order, then the system administrator himself cannot activate the apparatus.

In Japanese Patent Laid-Open No. 2002-22022, a technique is disclosed in which both of authentication by inputting a password and authentication by biological data are accepted at activation. By using this technique, it is possible for the system administrator to activate the apparatus by password authentication. In this technique, however, since general users other than the system administrator can also activate the apparatus by password authentication, only security performance at the same level as the case of performing only password authentication can be ensured. Thus, security performance is sacrificed in comparison with the case of setting authentication by biological data as only one authentication approach.

In Japanese Patent Laid-Open No. 2004-33859, a technique is disclosed in which an input screen for a general user and an input screen only for an administrator are provided, and it is possible to proceed to the input screen only for an administrator by an approach known only by the administrator. However, this is a stage after authentication has already been performed and is not related to authentication.

Since a computer apparatus cannot recognize in advance whether a user who is going to use the computer apparatus is a system administrator or a general user, it is not easy to display a screen enabling input of a password only to a system administrator. It is required to take measures, such as preparation of a separate, special activation mode, and activation processing or operation is complicated.

In order to solve this problem, a mechanism is required which allows a general user to perform only biological data authentication while allowing a system administrator to perform password authentication, without preparing a special activation mode for a system administrator, and further makes it unknown to a general user that the system administrator is allowed to use the password authentication.

SUMMARY OF THE INVENTION

The present invention has been made in view of the above circumstance and provides an authentication method and an authentication apparatus which provide different authentication approaches for a general user and a system administrator, respectively, without taking special measures such as preparation of a special activation mode, an authentication program storage device in which an authentication program for causing an information processing apparatus, such as a computer apparatus, to operate as such an authentication apparatus is stored.

The authentication method of the present invention is an authentication method for authenticating that a user is a valid user, the method having:

a setting step which sets one or both of a first authentication approach for performing authentication based on first-type authentication data and a second authentication approach for performing authentication based on second-type authentication data by a user operation;

a display step which displays that authentication by the authentication approach set by the setting step is to be accepted and displays, when only the first authentication approach is set, that only authentication by the first authentication approach is to be accepted; and an authentication step which performs authentication by the first authentication approach when only the first authentication approach is set and, for at least a part of users, performs authentication by the second authentication approach also.

It is preferable that, in the authentication method of the present invention, biological information about a user is treated as the first-type authentication data, and a password is treated as the second-type authentication data. For example, fingerprint information about a user may be treated as the first-type authentication data.

In the authentication method of the present invention, it is displayed that only the first authentication approach (for example, authentication by biological information) is to be accepted. As for authentication itself, however, not only authentication by the first authentication approach but also authentication by the second authentication approach (for example, authentication by password) is also performed at least for a part of users (for example, a system administrator identified by a username or a user ID). Thereby, it is possible to provide a different authentication approach for a part of users such as a system administrator while security performance is kept at a level, for example, as high as the case of accepting only authentication by biological information.

In the authentication method of the present invention, it is preferable that the authentication step includes a step which performs authentication by the authentication approach set by the setting step and, in the case of an authentication error, displays an indication to that effect; and that, when only the first authentication approach is set, the step continues displaying that only authentication by the first authentication approach is to be accepted even in the case of an authentication error being caused as a result of authentication by the second authentication approach, without displaying an indication of the authentication error.

As described above, in the authentication method capable of performing authentication processing to authenticate that a user is a valid user, though it is displayed that only authentication by one kind of authentication approach is to be accepted, authentication data for two types of authentication approaches are received so that authentication can be performed with any of the authentication data.

Thereby, it is possible to cause a general user to assume that only the first authentication approach is to be accepted, and the security performance can be kept high.

The present invention may be configured as an authentication apparatus for executing various aspects of the authentication method described above. Alternatively, it may be configured as an authentication program storage medium storing an authentication program which causes an information management apparatus such as a computer apparatus to operate as an authentication apparatus for executing the various aspects of the authentication method described above.

According to the present invention described above, it is possible to provide different authentication approaches for a general user and a system administrator, respectively, without taking special measures such as preparation of a special activation mode.

BRIEF DESCRIPTION OF THE DRAWINGS

FIG. 7 is a flowchart showing authentication processing performed when power is turned on;

DETAILED DESCRIPTION OF THE INVENTION

An embodiment of the present invention will be described below.

Figure 1:
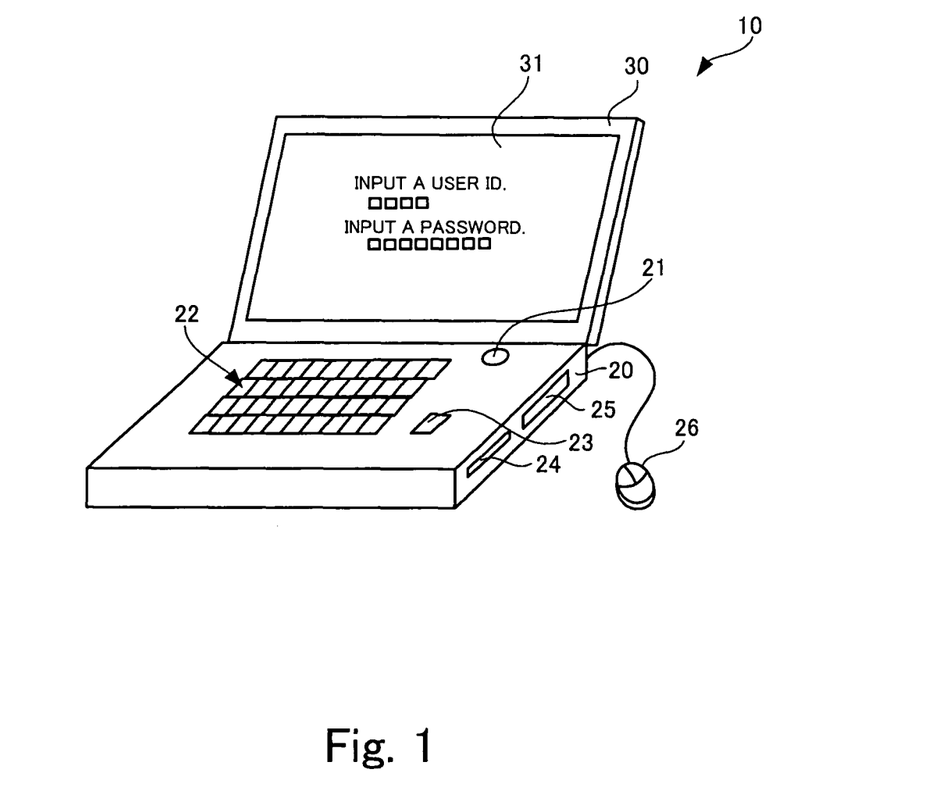
FIG. 1 is an external view of a notebook PC.

FIG. 1 is an external view of a notebook personal computer (hereinafter abbreviated as "a notebook PC").

The notebook PC 10 shown in FIG. 1 is configured by a main unit 20 and a display unit 30 which can be freely opened off and closed over the main unit 20.

The main unit 20 is provided with a power source button 21, a keyboard 22, a fingerprint sensor 23, an FD mounting slot 24 through which an FD (floppy disk (registered trademark)) is mounted, and a CD/DVD mounting slot 25 through which a CD or a DVD is mounted as components shown in FIG. 1, and a mouse 26 is connected thereto.

A display screen 31 spreads approximately on the entire front face of the display unit 30.

Figure 2:
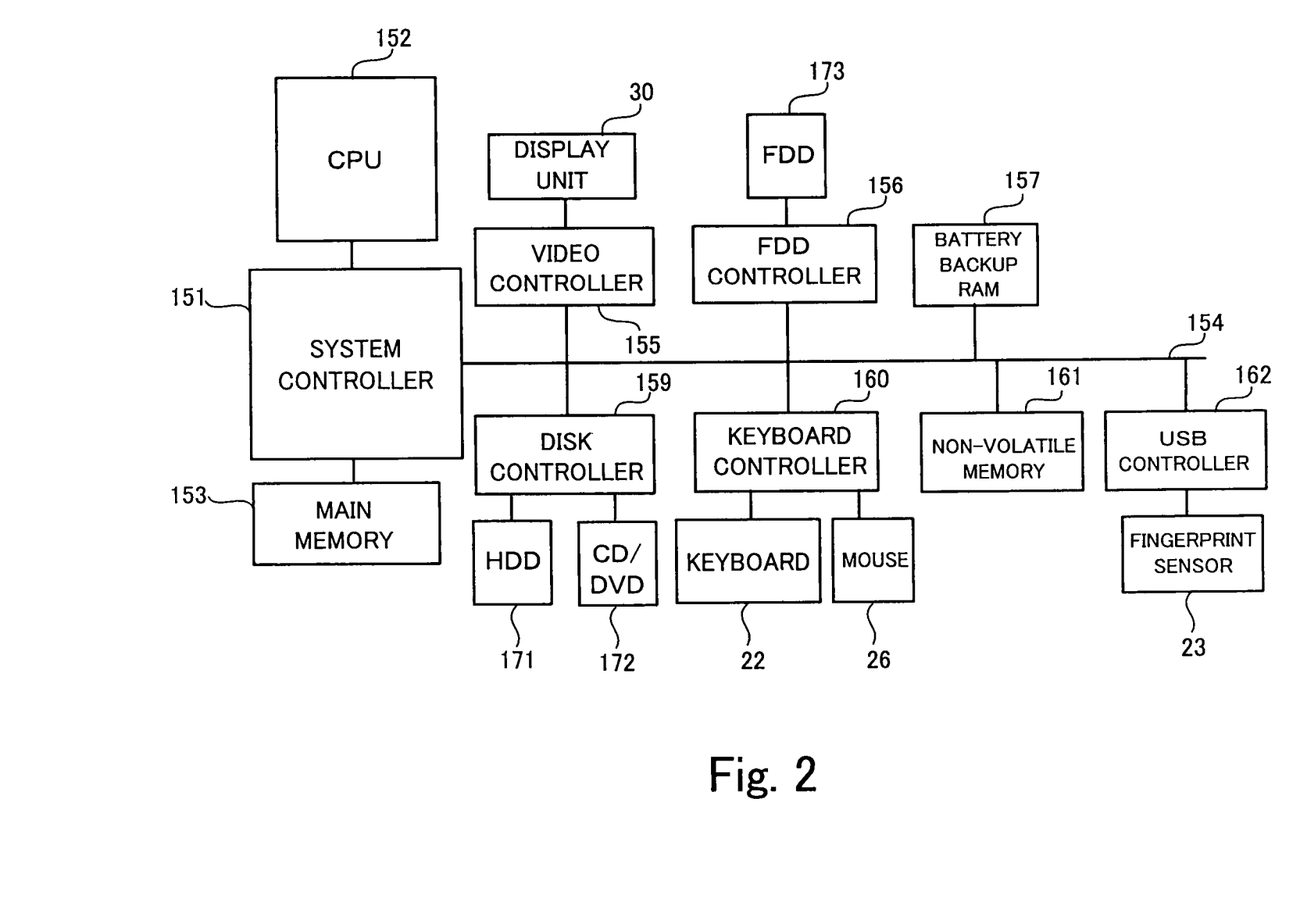
FIG. 2 is an internal block diagram of the notebook PC the external view of which is shown in FIG. 1.

FIG. 2 is an internal block diagram of the notebook PC the external view of which is shown in FIG. 1.

A CPU 152 and a main memory 153 are connected to a system controller 151. Furthermore, a video controller 155, an FDD controller 156, a battery backup RAM 157, a disk controller 159, a keyboard controller 160, a non-volatile memory 161 and a USB controller 162 are also connected via a bus 154.

The system controller 151 is a component responsible for controlling the entire system. The CPU 152 is a component responsible for executing a program developed on the main memory 153. The main memory 153 is a memory on which a program read from a hard disk (HD) included in a hard disk drive (HDD) 171 to be described later is developed to be executed by the CPU 152 and which is used as a work area for execution of the program.

The video controller 155 is responsible for displaying an image on the display screen 31 of the display unit 30, which is also shown in FIG. 1, in response to an instruction of the CPU 152 via the system controller 151. The FDD controller 156 is responsible for controlling an FD drive (FDD) 173 which is responsible for accessing an FD mounted through the FD mounting slot 24 shown in FIG. 1. The battery backup RAM 157 is a memory for non-volatilely storing various setting information about this PC 10. The fingerprint sensor 23 is a sensor for taking a user's fingerprint.

The disk controller 159 is a component for controlling the hard disk drive (HDD) 171 included in the main unit 20 (see FIG. 1) and a CD/DVD drive 172 for accessing a CD/DVD mounted through the CD/DVD mounting slot 25 shown in FIG. 1. A hard disk (HD) is included in the HDD 171, and in the HD, and there are stored an OS (operating system), various application programs and the like. These programs are read under the control of the disk controller 159 which has received an instruction from the system controller 151 and developed on the main memory 153 to be executed by the CPU 152.

A CD/DVD in which various programs and the like are stored is mounted in the CD/DVD drive 172 and accessed under the control of the disk controller 159, and the programs and the like stored in the CD/DVD are uploaded to the PC 10. They can also be stored in the HD included in the HDD 171.

Furthermore, the keyboard controller 160 is responsible for detecting an operation of the keyboard 22 and the mouse 26 which are also shown in FIG. 1 to communicate results of the detection to the system controller 151.

In the non-volatile memory 161, there is stored a program referred to as the BIOS (Basic Input/Output System) which is executed first after the PC 10 is powered on.

The USB controller 162 is a component responsible for communication control in accordance with the USB standard, and the fingerprint sensor 23 shown in FIG. 1 is connected thereto.

Figure 3:
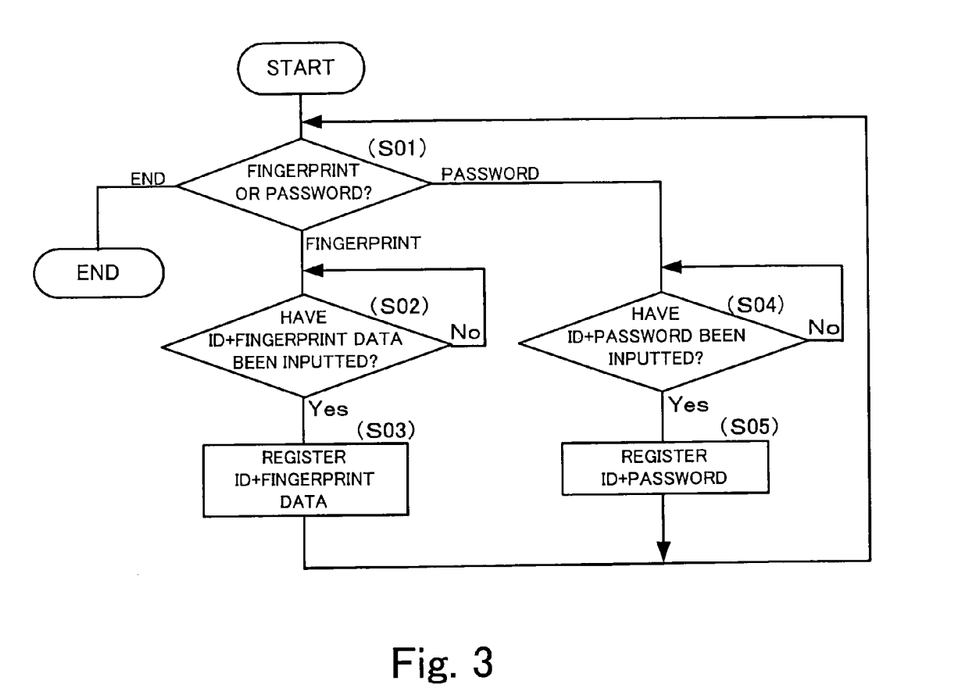
FIG. 3 is a flowchart of a program for registering a fingerprint or a password for authentication.

FIG. 3 is a flowchart of a program for registering a fingerprint or a password for authentication.

When the notebook PC 10 is powered on, the BIOS (Basic Input/Output System) stored in the non-volatile memory 161 is executed first, and after that an OS (operating system) stored in the HD included in the HDD 171 is executed. The program shown in FIG. 3 is one of application programs which operate under the OS.

When execution of the program shown in FIG. 3 is started, a screen (not shown) for selecting whether a fingerprint is to be registered, whether a password is to be registered, or whether the processing is to be ended is displayed. On the screen, a user selects any of "fingerprint", "password" and "end" (step S01).

If "fingerprint" is selected, then the process proceeds to step S02, where a message screen is displayed which is provided with a user ID input field and which prompts the user to input a user ID in the field and place a finger on the fingerprint sensor 23 (see FIG. 1) and the process waits for input. When a user ID is inputted on the screen, and a finger is placed on the fingerprint sensor 23 and fingerprint data is taken, the user ID and the fingerprint data is registered on the non-volatile memory 161 (step S03).

If "password" is selected at step S01, then the process proceeds to step S04, where a message screen is displayed which is provided with a user ID input field and a password input field and which prompts the user to input a user ID and a password, and the process waits for input (step S04). When a user ID and a password are inputted on the message screen, the process proceeds to step S05, and the inputted user ID and password are registered on the non-volatile memory 161.

If "end" is selected at step S01, then the process exits the routine shown in FIG. 3.

Here, it is possible to register both of an ID and a password with the same user ID. When another fingerprint or another password is registered again with the same user ID, previously registered fingerprint data is overwritten with the newly inputted fingerprint data, or a previously registered password is overwritten with the newly inputted password, and the new input is effective.

Figure 4:
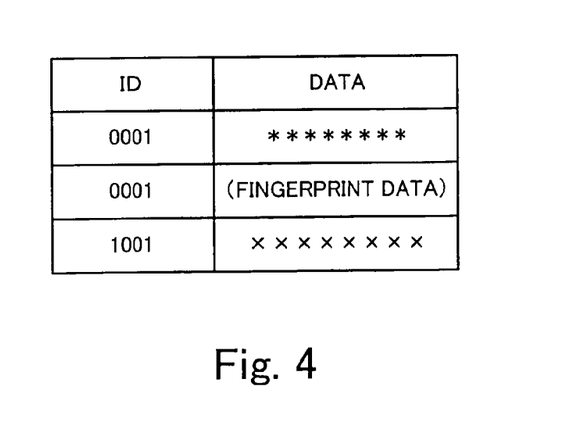
FIG. 4 shows an example of registered data on a non-volatile memory.

FIG. 4 shows an example of the data registered on the non-volatile memory 161.

Here, a password "******" and fingerprint data are registered by a user having a user ID of "0001", and a password "xxxxxxxx" is registered by a user having a user ID of "1001". In this case, the thousand's digit of the user ID ("0" of "0001" or "1" of "1001") indicates whether the user is a general user or a system administrator. The user ID for a general user is indicated by "0 . . . ", and the user ID for a system administrator is indicated by "1 . . . ". That is, FIG. 4 shows that the password "******" and fingerprint data have been registered by a general user having the user ID of "0001", and the password "xxxxxxxx" has been registered by a system administrator having the user ID of "1001".

Figure 5:
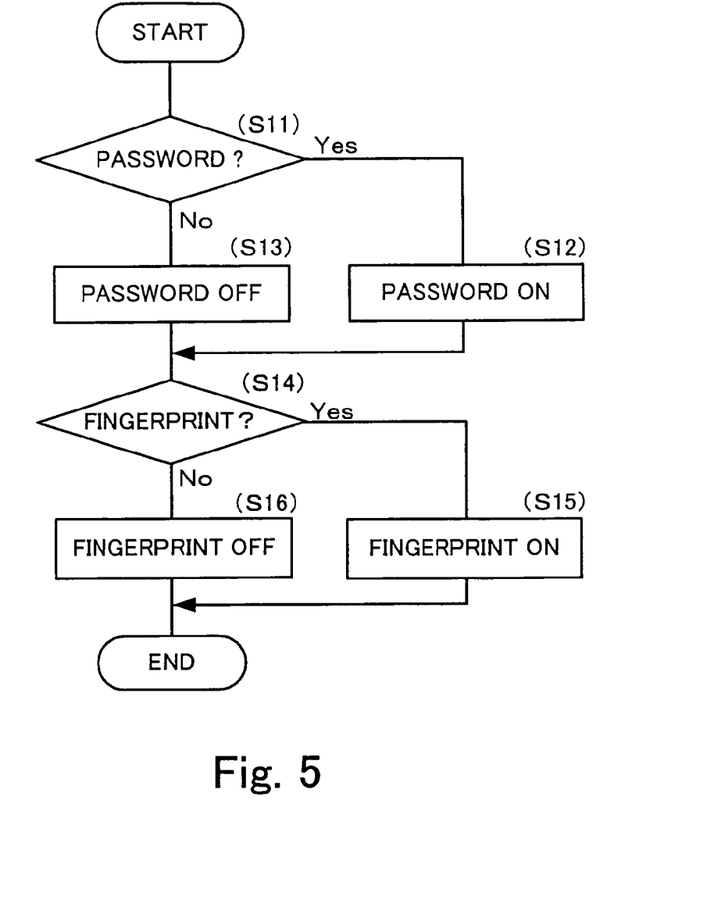
FIG. 5 is a flowchart of an authentication approach setting program.

FIG. 5 is a flowchart of an authentication approach setting program.

Here, it is set whether to perform authentication by password or authentication by fingerprint when the notebook PC shown in FIGS. 1 and 2 is powered on. Here, it is also possible to select a mode for accepting any of password authentication and fingerprint authentication or a mode for skipping authentication. The program in FIG. 5 is also one of the application programs which operate under the OS.

Figure 6:
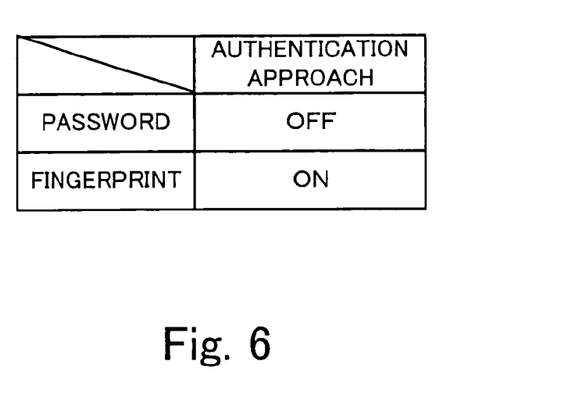
FIG. 6 shows an authentication approach setting table.

FIG. 6 shows an authentication approach setting table. Set-up and change in the table in FIG. 6 are made by the program in FIG. 5, and the table is registered on the non-volatile memory 161 shown in FIG. 2.

When the program in FIG. 5 is activated, a screen (not shown) is displayed which inquires of a user about whether authentication by password is to be performed and about whether authentication by fingerprint is to be performed. On this screen, it is set whether authentication by password/fingerprint is necessary or not.

In the program in FIG. 5, it is recognized whether or not to perform authentication by password (step S11). When authentication by password is to be performed, then "ON" is written in the field for the authentication approach using a password in the table in FIG. 6 (step S12). When authentication by password is not to be performed, then "OFF" is written in the field for the authentication approach using a password in the table in FIG. 6. Similarly, it is recognized whether or not to perform authentication by fingerprint (step S14). According to whether or not to perform authentication by fingerprint, "ON" or "OFF" is written in the field for the authentication approach using a fingerprint in the table in FIG. 6 (step S15 and S16).

In the example shown in FIG. 6, it is indicated that only authentication by fingerprint is accepted without accepting authentication by password. When "ON" is set for both of authentication by password and authentication by fingerprint, it means that both of password authentication and fingerprint authentication are accepted, and the user is authenticated if only one of the authentications is successful. When "OFF" is set for both of password authentication and fingerprint authentication, it means that the authentication processing is skipped and then the notebook PC is activated.

Figure 7:
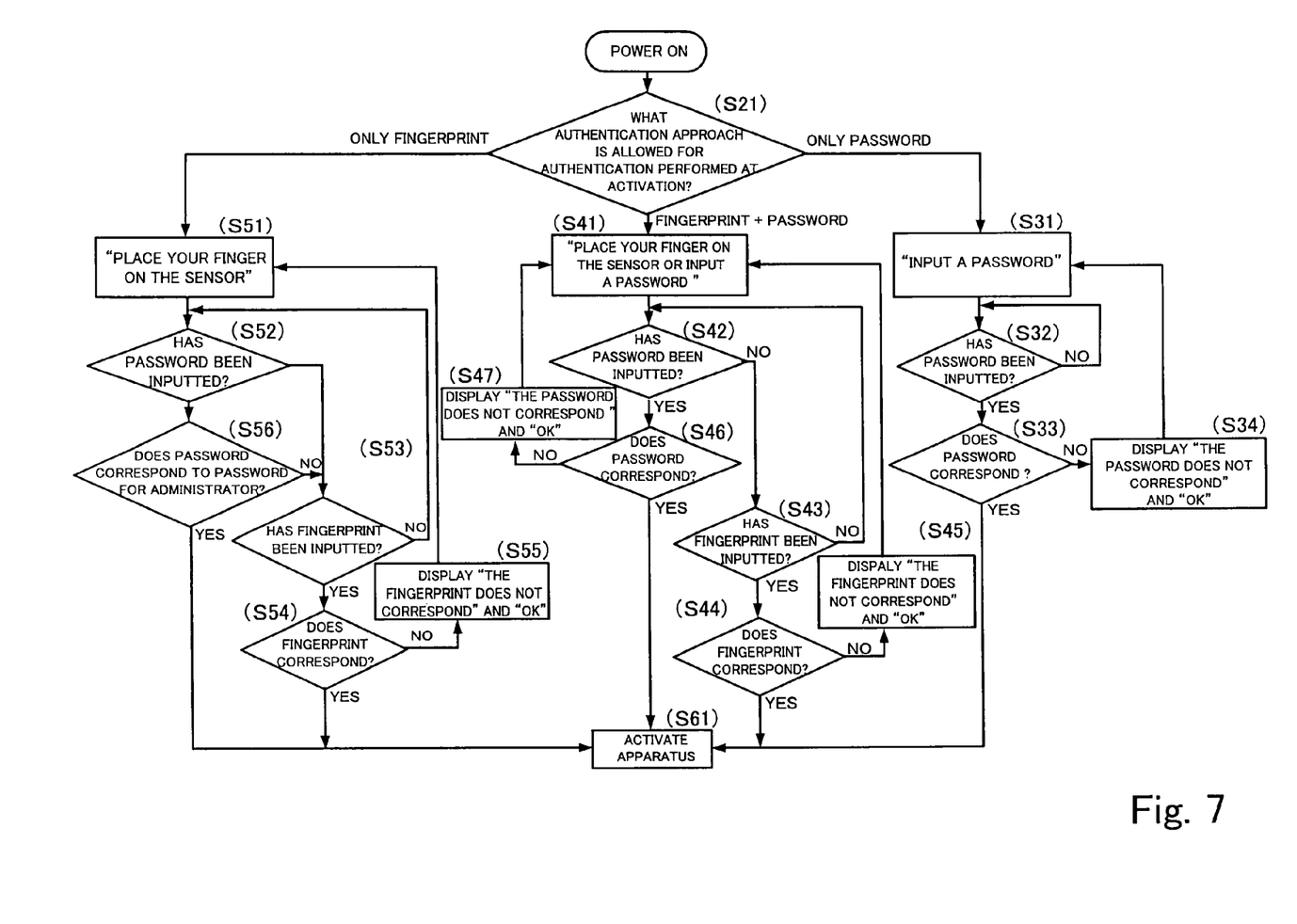

FIG. 7 shows a flowchart showing authentication processing performed when power is turned on.

When the power source button 21 in FIG. 1 is pressed and power is turned on, POST (power on self test) processing by the BIOS stored in the non-volatile memory 161 is started. During the POST processing, the authentication processing shown in FIG. 7 is performed.

When this authentication processing is started, the authentication approach used for activation is checked first by referring to the authentication approach setting table shown in FIG. 6 stored in the non-volatile memory 161. When only authentication by password is allowed, the process proceeds to step S31. When both of authentication by fingerprint and authentication by password are allowed, the process proceeds to step S41. When only authentication by fingerprint is allowed, the process proceeds to step S51.

Figure 8:
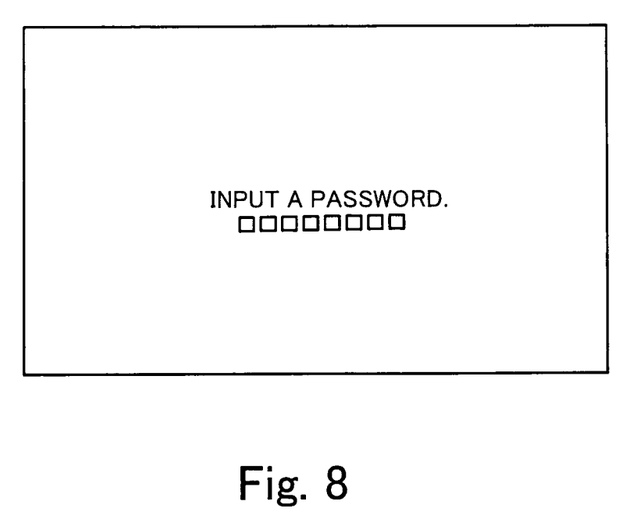
FIG. 8 shows a display message displayed when only password authentication is allowed.
Figure 9:
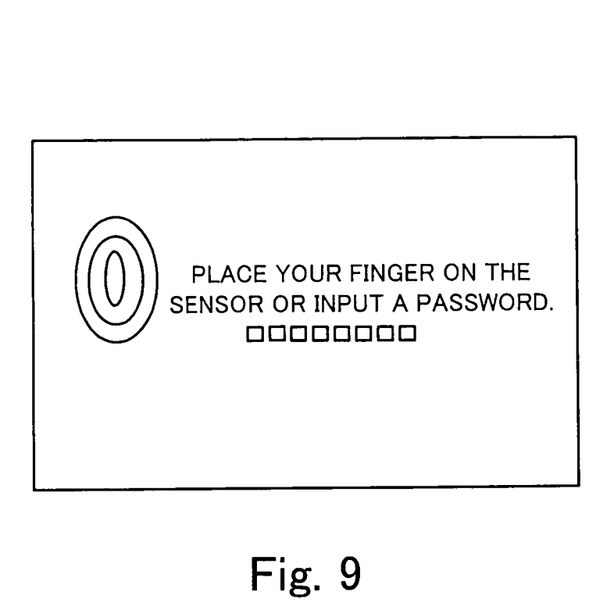
FIG. 9 shows a display message displayed when both of fingerprint authentication and password authentication are allowed.
Figure 10:
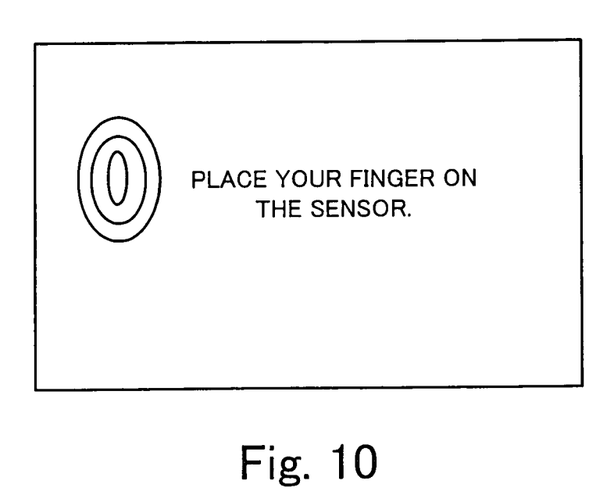
FIG. 10 shows a display message displayed when only fingerprint authentication is allowed.

FIG. 8 shows a display message displayed when only authentication by password is allowed. FIG. 9 shows a display message displayed when both of authentication by fingerprint and authentication by password are allowed. FIG. 10 shows a display message displayed when only authentication by fingerprint is allowed.

When only authentication by password is allowed, and the process proceeds to step S31 of FIG. 7, the screen prompting a user to input a password, which is shown in FIG. 8, is displayed, and the process waits for input of a password (step S32). Here, when a password is inputted, it is determined whether the same password is registered, by referring to the registered data (see FIG. 4) which has been registered on the non-volatile memory 161 in advance (step S33). If the passwords correspond to each other, then the apparatus is activated (step S61). On the other hand, if the passwords do not correspond to each other, then the process proceeds to step S34, where a message indicating that the passwords do not correspond to each other is displayed. Then, the process returns to step S31.

Figure 11:
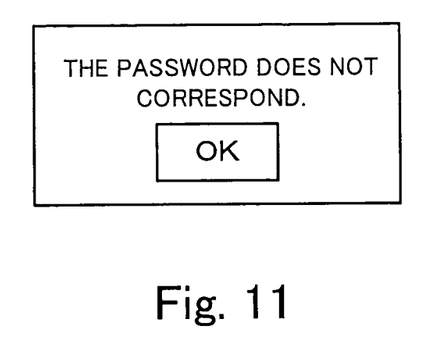
FIG. 11 shows a message screen displayed when passwords do not correspond to each other.

FIG. 11 shows a message screen displayed when passwords do not correspond to each other.

At step S34, the message screen shown in FIG. 11 is displayed. When the "OK" button is mouse-clicked, the process returns to step S31, and the message screen shown in FIG. 8 is displayed again.

If authentication by password fails three times, then a message screen informing an authentication failure is displayed and the process stops, though this is not shown in the flowchart of FIG. 7. In this case, the user is required to press the power source button 21 shown in FIG. 1 to power off the notebook PC once, and then press the power source button 21 again to power on the notebook PC again.

When it is determined at step S21 that both of authentication by fingerprint and authentication by password are allowed, and the process proceeds to step S41, the message screen prompting a user to input a password or have a fingerprint taken, which is shown in FIG. 9, is displayed, and the process waits for input of a password (step S42) or input of a fingerprint (step S43). If a password is inputted, then the process proceeds to step S46. The processings performed at steps S46 and S47 are the same as the processings performed at steps S33 and S34, respectively, and overlapping description thereof will be omitted.

Meanwhile, if a fingerprint is inputted (step S43), then the process proceeds to step S44, where, by referring to the registered data (see FIG. 4) which has been registered on the non-volatile memory 161 in advance, registered finger data and the finger data inputted this time are checked against each other. If they correspond to each other, then the apparatus is activated (step S61). If the fingerprint data do not correspond to each other, then the process proceeds to step S45, where it is displayed that the fingerprints do not correspond to each other. Then, the process returns to step S41.

Figure 12:
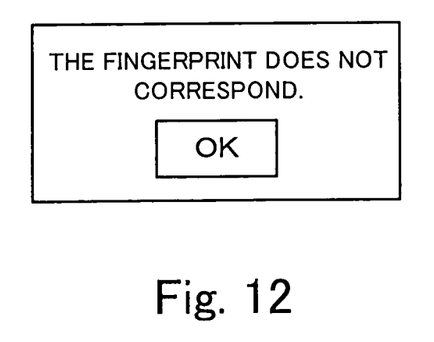
FIG. 12 shows a message screen displayed when fingerprints do not correspond to each other.

FIG. 12 shows a message screen displayed when fingerprints do not correspond to each other.

At step 45, the message screen shown in FIG. 12 is displayed. When the "OK" button is mouse-clicked, the process returns to step S41, and the message screen shown in FIG. 9 is displayed again.

If it is determined at step S21 that only authentication by fingerprint is allowed, and the process proceeds to step S51, then the message screen prompting a user to input a fingerprint, which is shown in FIG. 10, is displayed, and the process waits for input of a password (step S52) or input of a fingerprint (step S53).

Though the message displayed at step S51 is a message prompting a user to input a fingerprint, input of a password can be also activated here.

The processings at steps S53, S54 and S55 performed when a finger print is inputted are the same as the processings performed at step S43, S44 and S45, respectively, and overlapping description thereof will be omitted.

If a password is inputted here, then the process proceeds to step S56 without displaying anything about the password. Here, by referring to the registered data stored in the non-volatile memory 161, it is determined whether or not the password inputted this time corresponds to a password corresponding to a user ID for administrator (the thousand's digit thereof is "1") among the registered data. If it corresponds to the password, then the apparatus is activated (step S61). On the other hand, if it does not correspond to the password, then the process returns to step S52 via step S53. That is, a message screen or the like indicating that passwords do not correspond to each other, as shown in FIG. 11, is not displayed at all, and the display in FIG. 10 does not change at all.

Therefore, a general user assumes that only fingerprint authentication is possible. Meanwhile, a system administrator has been informed that password authentication is also possible, and therefore he can activate the apparatus by inputting a password.

Here, even if it is set that only authentication by fingerprint is allowed, a system administrator is allowed to perform authentication by password while a general user is allowed to perform only fingerprint authentication. However, it is also possible to display that only fingerprint authentication is allowed while allowing not only a system administrator but also a general user to perform authentication by password. Even in this case, a user or a malicious third person who does not know that authentication by password is possible assumes that only authentication by fingerprint is possible, and thereby security is ensured. In this situation, limited users other than the system administrator may be informed that authentication by password is also possible.

It has been described that the authentication processing in FIG. 7 is performed by the BIOS. The system of the notebook PC of this embodiment is configured so that, when the authentication by the BIOS is successful, authentication by the OS (operating system), which is activated subsequently to the BIOS, is automatically successful. Alternatively, it is also possible that the authentication mechanism in the BIOS shown in FIG. 7 is also applied to the OS so that the authentication processing as shown in FIG. 7 is performed again when the OS is activated.

What is claimed is:

1. An authentication method that causes an authentication apparatus to authenticate that a user is a valid user,
   the authentication apparatus including a storage section that stores first-type authentication data and second-type authentication data such that the first-type authentication data and the second-type authentication data are associated with each of a plurality of users and are associated with information for distinguishing whether each of the users is one within a group of the users or a user not within the group of the users, and
   the authentication method comprises:
   setting one or both of a first authentication approach for performing authentication based on the first-type authentication data and a second authentication approach for performing authentication based on the second-type authentication data by a user operation, the authentication being completed by either one of the first authentication approach and the second authentication approach, the first authentication approach and the second authentication approach being independent of each other while either one of the first authentication approach and the second authentication approach does not include the other;
   displaying that authentication by an authentication approach set by the setting is to be accepted and displaying, although authentication is completed through performing authentication by the second authentication approach without performing authentication by the first authentication approach and authentication is also completed through performing authentication by the first authentication approach for the group of the users when only the first authentication approach is set, an indication in terms of display that only the authentication by the first authentication approach is to be accepted, before processing of authentication is performed for the group of the users; and
   authenticating which includes performing, when only the first authentication approach is set, authentication by the first authentication approach, and also performing authentication by the second authentication approach when there is an authentication request by the second authentication approach in spite of the fact that only the first authentication approach is set and it is stored in the storage section that a user who performs the authentication request is included within the group of users.

2. The authentication method according to claim 1, wherein biological information about a user is treated as the first-type authentication data, and a password is treated as the second-type authentication data.

3. The authentication method according to claim 2, wherein fingerprint information about a user is treated as the first-type authentication data.

4. The authentication method according to claim 1, wherein the authenticating includes processing of performing authentication by the authentication approach set by the setting and, in the case of an authentication error, displaying an indication to that effect, and
when only the first authentication approach is set, the processing continues displaying that only authentication by the first authentication approach is to be accepted even in the case of an authentication error being caused as a result of authentication by the second authentication approach, without displaying an indication of the authentication error.

5. An authentication method capable of causing an authentication apparatus to perform authentication processing to authenticate that a user is a valid user by a first authentication approach for performing authentication based on first-type authentication data and a second authentication approach for performing authentication based on second-type authentication data, the authentication being completed by either one of the first authentication approach and the second authentication approach, the first authentication approach and the second authentication approach being independent of each other while either one of the first authentication approach and the second authentication approach does not include the other,
the authentication apparatus including a storage section that stores first-type authentication data and second-type authentication data such that the first-type authentication data and the second-type authentication data are associated with each of a plurality of users and are associated with information for distinguishing whether each of the users is one within a group of the users or a user not within the group of the users, and
the authentication method comprises:
displaying, although authentication is completed through performing authentication by the second authentication approach without performing authentication by the first authentication approach and authentication is also completed through performing authentication by the first authentication approach for the group of the users, an indication in terms of display that only the authentication by the first authentication approach is to be accepted, on a display device, before processing of authentication is performed for the group of the users; and
authenticating, which includes performing authentication by the first authentication approach, and also performing authentication by the second authentication approach when there is an authentication request by the second authentication approach and it is stored in the storage section that a user who performs the authentication request is included within the group of the users.

6. The authentication method according to claim 5, wherein biological information about a user is treated as the first-type authentication data, and a password is treated as the second-type authentication data.

7. The authentication method according to claim 6, wherein fingerprint information about a user is treated as the first-type authentication data.

8. The authentication method according to claim 5, wherein the authenticating includes:
display processing of displaying an indication of an authentication error if the result of authentication using the first-type authentication data received by the receiving is an error and of not displaying an indication of an authentication error if the result of authentication using the second-type authentication data received is an error.

9. An authentication apparatus for authenticating that a user is a valid user, the apparatus comprising:
a first storage section that stores first-type authentication data and second-type authentication data such that the first-type authentication data and the second-type authentication data are associated with each of a plurality of users and are associated with information for distinguishing whether each of the users is one within a group of the users or a user not within the group of the users;
a second storage section that stores an authentication approach which is set;
a setting section which sets in the second storage section one or both of a first authentication approach for performing authentication based on first-type authentication data and a second authentication approach for performing authentication based on second-type authentication data by a user operation, the authentication being completed by either one of the first authentication approach and the second authentication approach, the first authentication approach and the second authentication approach being independent of each other while either one of the first authentication approach and the second authentication approach does not include the other;
a display processing section which refers to the second storage section and causes a display device to display that only authentication by the authentication approach set in the second storage section by the setting section is to be accepted; and
an authentication section which refers to the second storage section and performs authentication by the authentication approach set in the second storage section by the setting section,
wherein the display processing section causes the display device to display, although authentication is completed through performing authentication by the second authentication approach without performing authentication by the first authentication approach and authentication is also completed through performing authentication by the first authentication approach for the group of the users when only the first authentication approach is set in the second storage section, an indication in terms of display that only the authentication by the first authentication approach is to be accepted, before processing of authentication is performed for the group of the users, and the authentication section performs, when only the first authentication approach is set in the second storage section, authentication by the first authentication approach and performs also authentication by the second authentication approach when there is an authentication request by the second authentication approach in spite of the fact that only the first authentication approach is set in the second storage section and it is stored in the first storage section that a user who performs the authentication request is included within the group of the users.

10. The authentication apparatus according to claim 9, comprising:
a biological sensor which detects biological information about the user; and
an input device with which a password input operation is performed by the user,
wherein the authentication apparatus treats the biological information about the user detected by the biological sensor as the first-type authentication data, and the password inputted by the operation of the input device as the second-type authentication data.

11. The authentication apparatus according to claim 10, wherein the biological sensor is a fingerprint sensor which detects the user's fingerprint, and the authentication apparatus treats fingerprint information about the user detected by the fingerprint sensor as the first-type authentication data.

12. The authentication apparatus according to claim 9, wherein the authentication section performs authentication by the authentication approach set by the setting section and, in the case of an authentication error, causes the display processing section to display an indication to that effect, and when only the first authentication approach is set, the authentication section causes the display processing section to continue displaying that only authentication by the first authentication approach is to be accepted, even in the case of an authentication error being caused as a result of authentication by the second authentication approach, without causing the display processing section to display an indication of the authentication error.

13. An authentication apparatus capable of performing authentication processing to authenticate that a user is a valid user by a first authentication approach for performing authentication based on first-type authentication data and a second authentication approach for performing authentication based on second-type authentication data, the authentication being completed by either one of the first authentication approach and the second authentication approach, the first authentication approach and the second authentication approach being independent of each other while either one of the first authentication approach and the second authentication approach does not include the other, the apparatus comprising:

a first storage section that stores first-type authentication data and second-type authentication data such that the first-type authentication data and the second-type authentication data are associated with each of a plurality of users and are associated with information for distinguishing whether each of the users is one within a group of the users or a user not within the group of the users;

a second storage section that stores an authentication approach which is set;

a display processing section which causes a display device to display, although authentication is completed through performing authentication by the second authentication approach without performing authentication by the first authentication approach and authentication is also completed through performing authentication by the first authentication approach for the group of the users when the display processing section refers to the second storage section and only the first authentication approach is set in the second storage section, an indication in terms of display that only the authentication by the first authentication approach is to be accepted, before processing of authentication is performed for the group of the users; and an authentication section which performs, when the authentication section refers to the second storage section and only the first authentication approach is set in the second storage section, authentication by the first authentication approach and performs also authentication by the second authentication approach when there is an authentication request by the second authentication approach in spite of the fact that only the first authentication approach is set in the second storage section and it is stored in the first storage section that a user who performs the authentication request is included within the group of the users.

14. The authentication apparatus according to claim 13, wherein biological information about a user is treated as the first-type authentication data, and a password is treated as the second-type authentication data.

15. The authentication apparatus according to claim 14, wherein fingerprint information about a user is treated as the first-type authentication data.

16. The authentication apparatus according to claim 13, wherein the authentication section causes the display processing section to display an indication of an authentication error if the result of authentication using the first-type authentication data received by the receiving section is an error and does not cause the display processing section to display an indication of an authentication error if the result of authentication using the second-type authentication data received by the receiving section is an error.

17. A non-transitory computer-readable storage medium storing an authentication program which is executed in an information processing apparatus for executing programs and causes the information processing apparatus to operate as an authentication apparatus for authenticating that a user is a valid user, the authentication apparatus comprising:

a first storage section that stores first-type authentication data and second-type authentication data such that the first-type authentication data and the second-type authentication data are associated with each of a plurality of users and are associated with information for distinguishing whether each of the users is one within a group of the users or a user not within the group of the users;

a second storage section that stores an authentication approach which is set;

a setting section which sets in the second storage section one or both of a first authentication approach for performing authentication based on first-type authentication data and a second authentication approach for performing authentication based on second-type authentication data by a user operation, the authentication being completed by either one of the first authentication approach and the second authentication approach, the first authentication approach and the second authentication approach being independent of each other while either one of the first authentication approach and the second authentication approach does not include the other;

a display processing section which refers to the second storage section and causes a display device to display that only authentication by the authentication approach set in the second storage section by the setting section is to be accepted; and an authentication section which refers to the second storage section and performs authentication by the authentication approach set in the second storage section by the setting section, wherein the display processing section causes the display device to display, although authentication is completed through performing authentication by the second authentication approach without performing authentication by the first authentication approach and authentication is also completed through performing authentication by the first authentication approach for the group of the users when only the first authentication approach is set in the second storage section, an indication in terms of display that only the authentication by the first authentication approach is to be accepted, before processing of authentication is performed for the group of the users, and the authentication section performs, when only the first authentication approach is set in the second storage section, authentication by the first authentication approach and performs also authentication by the second authentication approach when there is an authentication request by the second authentication approach in spite of the fact that only the first authentication approach is set in the second storage section and it is stored in the first storage section that a user who performs the authentication request is included within the group of the users.

18. The non-transitory computer-readable storage medium according to claim 17, wherein the authentication apparatus comprises:
   a biological sensor which detects biological information about the user; and
   an operator with which a password input operation is performed by the user,
   wherein the authentication apparatus treats the biological information about the user detected by the biological sensor as the first-type authentication data, and the password inputted by the operation of the operator as the second-type authentication data.

19. The non-transitory computer-readable storage medium according to claim 18, wherein the biological sensor is a fingerprint sensor which detects the user's fingerprint, and
   the authentication apparatus treats fingerprint information about the user detected by the fingerprint sensor as the first-type authentication data.

20. The non-transitory computer-readable storage medium according to claim 17, wherein the authentication section performs authentication by the authentication approach set by the setting section and, in the case of an authentication error, causes the display processing section to display an indication to that effect, and
   when only the first authentication approach is set, the authentication section causes the display processing section to continue displaying that only authentication by the first authentication approach is to be accepted, even in the case of an authentication error being caused as a result of authentication by the second authentication approach, without causing the display processing section to display an indication of the authentication error.

21. A non-transitory computer-readable storage medium, storing an authentication program which is executed by an authentication apparatus capable of performing authentication processing to authenticate that a user is a valid user, by a first authentication approach for performing authentication based on first-type authentication data and a second authentication approach for performing authentication based on second-type authentication data, the authentication being completed by either one of the first authentication approach and the second authentication approach, the first authentication approach and the second authentication approach being independent of each other while either one of the first authentication approach and the second authentication approach does not include the other, the authentication apparatus includes a storage section that stores first-type authentication data and second-type authentication data such that the first-type authentication data and the second-type authentication data are associated with each of a plurality of users and are associated with information for distinguishing whether each of the users is one within a group of the users or a user not within the group of the users, and causes the authentication apparatus to perform:
   displaying, although authentication is completed through performing authentication by the second authentication approach without performing authentication by the first authentication approach and authentication is also completed through performing authentication by the first authentication approach for the group of the users, an indication in terms of display that only the authentication by the first authentication approach is to be accepted, before processing of authentication is performed for the group of the users, on a display device; and
   authenticating, which includes performing authentication by the first authentication approach, and also performing authentication by the second authentication approach when there is an authentication request by the second authentication approach and it is stored in the storage section that a user who performs the authentication request is included within the group of the users.

22. The non-transitory computer-readable storage medium according to claim 21, wherein the authentication apparatus treats biological information about a user as the first-type authentication data, and a password as the second-type authentication data.

23. The non-transitory computer-readable storage medium according to claim 22, wherein the authentication apparatus treats fingerprint information about a user as the first-type authentication data.

24. The non-transitory computer-readable storage medium according to claim 21, wherein the authenticating includes display processing which displays an indication of an authentication error if the result of authentication using the first-type authentication data received by the receiving is an error and does not display an indication of an authentication error if the result of authentication using the second-type authentication data received by the receiving is an error.

* * * * *